United States Patent [19]
Staes et al.

[11] 3,748,981
[45] July 31, 1973

[54] METHOD FOR DETERMINING THE EXPOSURE OF A RECORDING MATERIAL

[75] Inventors: Karel Germanus Staes, Wilrijk; Luc Yves Natens, Berchem, both of Belgium

[73] Assignee: Agfa-Gevaert, Mortsel, Belgium

[22] Filed: July 22, 1969

[21] Appl. No.: 843,597

[30] Foreign Application Priority Data
July 22, 1968 Great Britain .................. 34,896/68

[52] U.S. Cl. ............................................. 95/12.2
[51] Int. Cl. ............................................. G03b 33/00
[58] Field of Search ..................................... 95/12.2

[56] References Cited
UNITED STATES PATENTS

| | | | |
|---|---|---|---|
| 3,178,999 | 4/1965 | Clapp .................................. | 355/38 |
| 3,144,510 | 8/1964 | Farber ............................. | 355/38 X |
| 2,059,884 | 11/1936 | Mannes ................................. | 96/22 |
| 3,051,069 | 8/1962 | Neale .................................. | 355/77 |
| 3,067,649 | 12/1962 | Szymczak .......................... | 250/226 |

Primary Examiner—John M. Horan
Attorney—William J. Daniel

[57] ABSTRACT

A method and apparatus for photographically recording colour subjects onto recording material which is spectrally sensitive in different regions of the visible light spectrum.

The luminance of the colour subject is measured in at least two of the different regions wherein the recording material is sensitive, the exposure of the recording material is predetermined in taking the measured luminance of the subject in the region of greatest luminance more into account than the measured luminance(s) of the region(s) of smaller luminance, and the recording material is exposed to the colour subject to an extent which is in accordance with said predetermined exposure.

4 Claims, 6 Drawing Figures

METHOD FOR DETERMINING THE EXPOSURE OF A RECORDING MATERIAL

The present invention relates to a method and apparatus for photographically recording colour subjects.

In order to obtain a good quality photographic record of a colour subject on a photographic recording material which is spectrally sensitive in different regions of the visible light spectrum, it is necessary to predetermine an appropriate exposure of the recording material to the given subject. This is done by means of an instrument, known as an exposure-meter, which measures the brightness or the luminance of the subject. As a function of the speed of the recording material, the exposure-meter provides indications of suitable combinations of diaphragm apertures and exposure times to permit the operator to adjust the recording apparatus. Alternatively the adjustments may be automatically controlled. Standards relative to the construction and use of exposure-meters have not so far led to uniformity and they, moreover, remain vague at different points such as the acceptance angle of the meter and the method of calibration.

There is no universal standard governing the spectral response of exposure-meters. According to ASA Standard PH 2.12 – 1961, the spectral sensitivity for reflected-light exposure-meters is defined as follows. The spectral sensitivity of the exposure-meter shall be continuous in the range between 350 nm and 700 nm. Not more than 5 percent of the total response of the meter (including its cover glass) shall be due to wavelengths longer than 700 nm when the meter is exposed to a source of equal energy at all wavelengths, and not more than 5 percent of the total response shall be due to wavelengths shorter than 350 nm when tested in the same manner.

In German Standard DIN 19010 and in British Standard B.S. 1383 no indications are given relating to the spectral sensitivity of an exposure-meter.

In more recent literature, e.g. in the article "Spot Photometers in Exposure Control" by H.P. Field in the Journal of SMPTE, Vol. 74, p. 592–593 and in the article "The Design of Exposure Meters" by H. Thiele in the same Journal, Vol. 76, p. 1001–1004, it is mentioned that the spectral sensitivity of the exposure-meter should be adapted to the average spectral sensitivity of the recording material. More particularly, according to the second author, the spectral response of the exposure-meter must correspond with the spectral response of the eye.

From the survey given hereinbefore, and also from an examination of the apparatus commonly used, it may be concluded that a conventional exposure determination comprises one reflected-light measurement over the complete visible range of the spectrum and the result of this one measurement determines the adjustment of the recording apparatus in which the recording material is exposed.

The described conventional reflected-light exposure-meters and the methods for using them only provide fully satisfactory results when recording average grey subjects. When recording subjects the integrated spectral composition of which deviates from average grey, the recording material will inevitably become over-exposed.

The reason therefor is as follows. If the colour scene is an average grey scene, e.g., a test chart containing blue, green and red fields, and the meter reading is correct, the exposure settings thus shown will ensure a correct exposure. However, the meter reading will indicate a much smaller luminosity if the reflection of two colours, e.g. the green and the red, is reduced to zero by covering the green and red areas of the chart by a black mask. If the recording apparatus is adjusted in accordance with the measured smaller luminosity, the recording material will become over-exposed since the exposure of the material to blue will be several times greater than when the material was exposed to the three colours simultaneously, notwithstanding that in actual fact the luminosity of the blue part of the subject has not changed at all.

The present invention is based on appreciation of the fact that a colour scene must not as a general rule be considered as an average grey subject but is often equivalent to an average grey subject modified by the exclusion of an amount of light in one or more colour bands of the light spectrum.

It has been found that the over-exposure referred to can be avoided, or at least reduced to a considerable extent, if the luminance of the colour subject is determined in at least two of the different spectral regions wherein the recording material is sensitive, and if in determining the exposure of the recording material, the luminance of the subject in the region of greatest or greater luminance is taken more into account than the luminance(s) of the subject in the region(s) of smaller luminance.

According to the present invention, there is provided a method of photographically recording a colour subject on a recording material which is spectrally sensitive in different regions of the visible light spectrum which method comprises the steps of :

a. measuring the luminance of the colour subject in at least two of the different spectral regions wherein the recording material is sensitive, and b. exposing the recording material to the colour subjects to an extent which is predetermined either on the basis of the measured luminance of the subject in the region of the greater or greatest luminance, or on the basis of different said measured luminances, but so that the measured luminance of the subject in the region of the greater or greatest luminance is of greater influence in such predetermination than the measured luminance(s) of the subject in the region(s) of smaller luminance.

Where reference is made herein to the extent of exposure, this denotes the total amount of light emanating from the subject and incident upon the recording material, and is thus determined by the stop setting and exposure time setting of the recording apparatus loaded with the recording material.

It is preferably to predetermine the extent of exposure solely on the basis of the luminance measurement which shows the higher or the highest luminance.

The notion "measuring the luminance" should be broadly interpreted and includes not only conventional measuring by photo-electric reflected-light exposure-meters but also a determination of the luminance or the brightness of the subject in a given spectral region by means of optical or optical-electrical exposure-meters.

In one way, on predeterminating the extent of exposure, e.g., of a conventional colour film to a colour scene, a conventional reflected-light exposure-meter is used and three measurements are made while a bluea green and a red filter respectively are located in front of the exposure-meter, the transmission characteristics of said filters corresponding generally with the sensitization of the three light-sensitive layers of the colour film. The three measured light values are each multiplied by a factor by which the reading through the corresponding filter must be multiplied in order to obtain three equal readings if the meter were exposed to an average grey subject. Only the meter reading corresponding to the region of greatest luminance is considered for the adjusting by the operator of the camera.

From the foregoing it will be understood that the measurement which is carried out in the method of the present invention is a reflected-light measurement. This notion should be broadly interpreted and includes the measurement of the light which is reflected by an opaque subject, as well as of the light which is transmitted by a transparent original, e.g., a colour-slide. This is distinct from the measurement of light which is falling on the subject, and whice is known as incident-light measurement.

An improved device for determining the exposure of a recording material which has to be exposed to a colour subject and which is spectrally sensitive in different regions of the visible spectrum may comprise at least two photo-electric cell means each of which is responsive to one of said different sensitivity regions of the recording material and produces an electric signal which is a measure of the luminance of the subject in said specific region.

An exposure-meter according to the present invention may comprise :

a. means for splitting a beam of incident light in the blue, the green and the red spectral region of the visible spectrum, b. three photoelectric cell means each of which receives light in one of said specific regions, c. three amplifiers for amplifying the electric signals produced by the said photoelectric cell means, and d. means for comparing the output signals of the amplifiers with each other and for selecting the signal which corresponds to the region in which the luminance is the greatest. The described arrangement, although appearing relatively complicated, may operate very reliable and may have very small dimensions, if use is made for the electronic part, of micro-electric elements such as integrated circuits.

The photo-electric cell means may be of the photovoltaic type, e.g., a selenium cell or a silicium diode, of the photo-resistive type, e.g. a cadmium-sulfide light-depending resistor, they may comprise a phototransistor, a photomultiplier tube, etc.

The exposure-meter may be an independent unit designed for operation with one hand, or it may be incorporated in the recording apparatus and the control of the exposure settings of such apparatus may occur automatically or through the intervention of the operator.

The measurement by an inbuilt exposure-meter may occur through the lens of the recording apparatus or it may occur in the vicinity of the lens.

The acceptance angle of the exposure-meter may be smaller than the taking angle of the recording apparatus and may even have a small value such as encountered in spotphotometers.

The term "recording material" as used in the present specification, includes any material or system which is spectrally sensitive in at least two different regions of the visible spectrum, and wherein the colour subject is reproduced in the form of a negative or a positive image, or in the form of an electrical charge pattern. The mentioned recording material may be light-sensitive black-and-white or colour photographic film used in still picture photography, motion picture photography, telefilm recording, in a photographic copying or printing apparatus, etc., but it may also be the screen or screens of an image-recording tube or -system.

The regions of the visible spectrum wherein the recording material is spectrally sensitive depend on the particular type of recording material. Thus, in the case of a conventional negative or reversal type of colour film, these regions are the blue, the green and the red part of the visible spectrum. In the case of a black and white film the regions are the blue and the green regions, for an orthochromatic, and the blue, the green and the red regions for a panchromatic film.

It should be understood that the spectral sensitivity of the recording material may extend in a range or ranges outside the visible spectrum, and thus recording materials having a sensitivity which extends up into the UV or the IR region also lend themselves to an improved exposure according to the method of the invention.

The invention is described hereinafter with reference to the accompanying drawings wherein.

Figure 1:
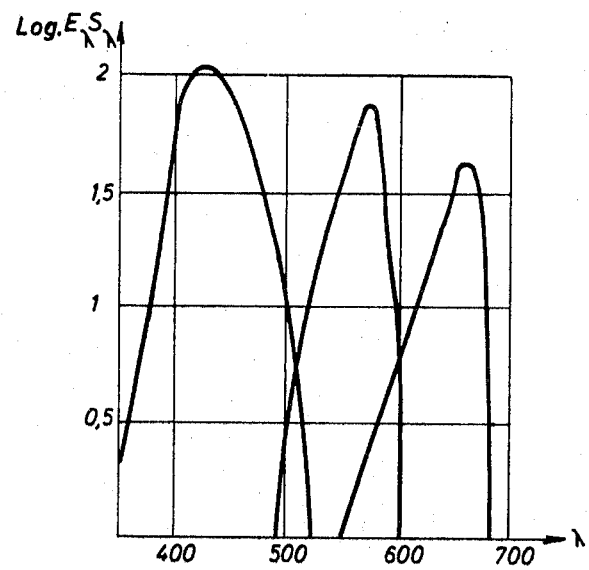
FIG. 1 shows the spectral sensitization of a colour film.

In FIG. 1 the spectral sensitivity curves of a common photographic colour reversal material are shown, which have been determined by means of a common spectrosensitometer using an incandescent tungsten filament operating at a temperature of 3,200°K. The curves are plotted as effective response to the lamp. The parameter $\lambda$ of the graph represents the wavelength in nm, whereas $E_\lambda$ is the energy distribution of the light source of 3,200°K and $S_\lambda$ is the sensitivity of the material as a function of the wavelength.

Figure 2:
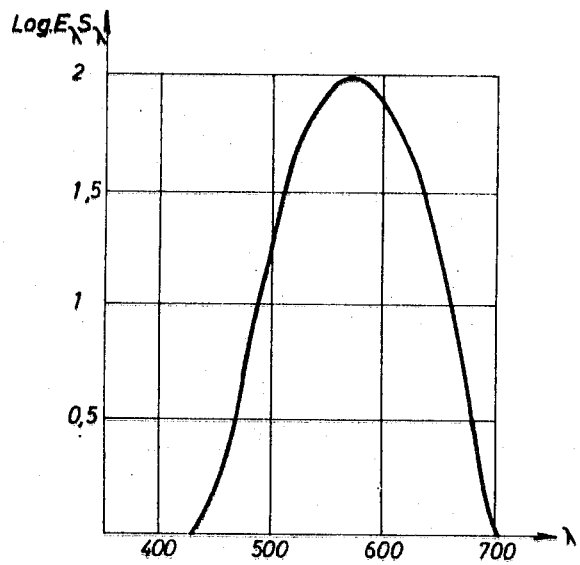
FIG. 2 is the spectral response of an exposure-meter.

In FIG. 2 the spectral response of the exposure-meter which is used in the present example, is shown. The curve generally corresponds to the spectral sensitivity of the eye and is also plotted as effective response to a lamp operating at 3,200°K, $s_\lambda$ being the sensitivity of the meter as a function of the wavelength, and $E_\lambda$ being again the energy distribution of a light source of 3,200°K. The exposure-meter is calibrated according to the speed of the colour material to indicate the exact exposure, i.e., exposure time and diaphragm opening. If an average grey scene is recorded, see the line drawn in full in the diagram of FIG. 3, the exposure-meter will give the following indication $E_e$ of the integrated effective light quantum reaching the photo-sensitive cell of the meter.

$$E_e = \int_\lambda E_\lambda \cdot R_\lambda \cdot s_\lambda \cdot d_\lambda$$

wherein :

$E_\lambda$ = spectral energy distribution of the light source
$R_\lambda$ = spectral reflectance of the scene
$s_\lambda$ = spectral response of the exposure-meter.

With an average grey sceen is intended in the present description a scene by which the overall luminance of the light, which is reflected or transmitted by the scene, is weakened with the exclusion however of alterations in chromacity, i.e., in hue and saturation of said light.

Figure 3:
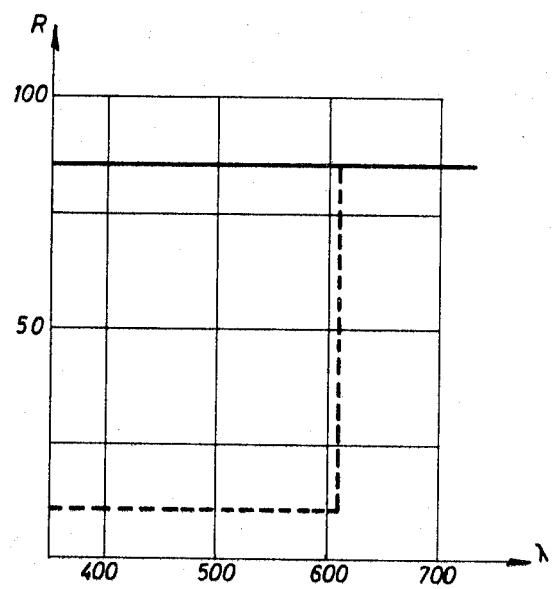
FIG. 3 is a diagram, wherein the reflectance of an average grey and a red subject are plotted.

If a red scene is recorded with a spectral reflectance which is equal to that of the grey scene in the red region, see the curve in broken lines in FIG. 3, the exposure-meter will indicate a much smaller light energy, because less light is received on the photo-sensitive cell thereof.

As a consequence of the reduced reading of the exposure-meter the exposure of the photographic material will be increased so that over-exposure will result, and the red colour rendering will appear desaturated. The same reasoning applies to the rendering of blue and magenta scenes.

The over-exposure will be less for green, yellow, and cyan scenes, because the exposure-meter is substantially green sensitive and thereby is less responsive to the absence of red and/or blue from the measured spectrum.

Figure 4:
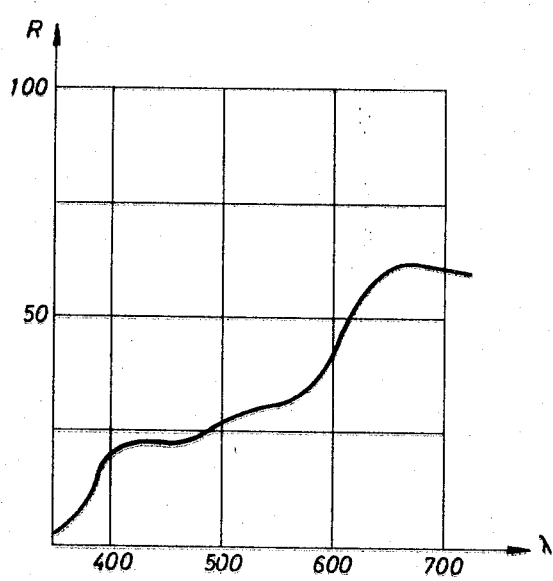
FIG. 4 is a diagram wherein the spectral skin reflectance is plotted.

Hereinafter a numerical example is given for the recording of a grey and a red subject with a reflectance as already described, and of the skin tone, the spectral reflectance of which is shown in FIG. 4.

In the table the light energy values $$E_e = \int_\lambda E_\lambda \cdot s_\lambda \cdot R_\lambda \cdot d\lambda$$

are given to which the photographic material which has a spectral sensitivity as shown in FIG. 1, and the cell of a conventional exposure-meter which has a spectral sensitivity as shown in FIG. 2, effectively responds. The actually measured light values of each column have been multiplied by a factor to obtain equal values for the first row, representing the energy quanta produced by reflection from a grey subject.

Table : Effective light values $$E_e = \int_\lambda E_\lambda \cdot s_\lambda \cdot R_\lambda \cdot d\lambda$$

| Subject | Photographic material | | | Exposure meter |
|---|---|---|---|---|
| | blue sens. layer | green sens. layer | red sens. layer | |
| grey | 1357 | 1357 | 1357 | 1357 |
| red | 160 | 160 | 1254 | 375 |
| skin | 380 | 519 | 938 | 599 |

From the Table it appears that the exposure-meter indicates for the red subject a luminance value which is 3.33 times smaller, and for the skin tone a value which is 1.56 times smaller than the actual luminance thereof as "seen" by the photographic material.

When the recording apparatus, e.g., the motion picture camera or the still picture camera, is adjusted according to the reading of the exposure-meter, the red subject will be over-exposed by a factor 0.52 logIt and the skin tones will be over-exposed by a factor 0.20 logIt.

When the spectral sensitivity of the exposure meter is higher in the red or in the blue than in the other regions, the anomalous readings of the meter will occur in other regions.

If the spectral sensitivity of the exposure-meter is uniform throughout the visible range of the spectrum, anomalous behaviour as described still occurs.

If a black and white photographic light-sensitive material which is sensitive in the blue, the green and the red region were exposed to the scenes described hereinbefore, instead of the colour reversal material, over-exposure would occur as well for subjects deviating from the average grey.

The mentioned errors in the determination of the exposure are reduced to a great extent if the luminance of the subject is determined separately in the blue, the green and the red region, and if the reading of the exposure-meter corresponding to the region of greatest luminance of the subject is taken more into account than the readings corresponding to the other regions or, more particularly, if only the reading of the exposure-meter corresponding to the region of greatest luminance is taken as relevant to the exposure of the recording material.

This becomes clear when the values of the fourth and the fifth column of the table are compared with each other. The reading of the exposure-meter which is correct indeed for the average grey subject is much too low for the red subject, and too low also for the skin tone.

The selection of the spectral sensitivity regions of the cells or the cell of the exposure-meter used in the luminance measurements is determined essentially by the spectral sensitivities of the recording material.

Theoretically, the spectral sensitivities of recording material and exposure-meter should coincide, including the additional absorptions caused by the lenses, covering glasses, neutral density filters, colour temperature conversion filters, etc. The great variety of known recording materials exclude such theoretical approach, but it is possible to make the spectral response of an exposure-meter correspond with the average sensitivity of a large number of commonly used recording materials, for each sensitivity region thereof, by an appropriate choice of the photo-responsive cells of the exposure-meter and/or the filters to be used therewith.

When the spectral response of an exposure-meter has been determined as described, the sensitivity in each region is adjusted as follows. An average grey subject is illuminated by a light-source of the appropriate colour temperature, and the value of the luminance measured by the green sensitive cell is made to correspond with the reading on a conventional exposure-meter. This correspondence may occur by multiplication of the measured value by an appropriate factor, or by adjusting the sensitivity control of the exposure-meter.

Next, the values of the luminances measured by the blue and the red sensitive cells are multiplied by a factor to correspond with the value as measured by the green sensitive cell, or the sensitivity controls of the blue and red cells are set to obtain equal readings.

As a further requirement of the three cells is to be mentioned that (for optimum results) their responses as a function of the light intensity must be equal.

Figure 5:
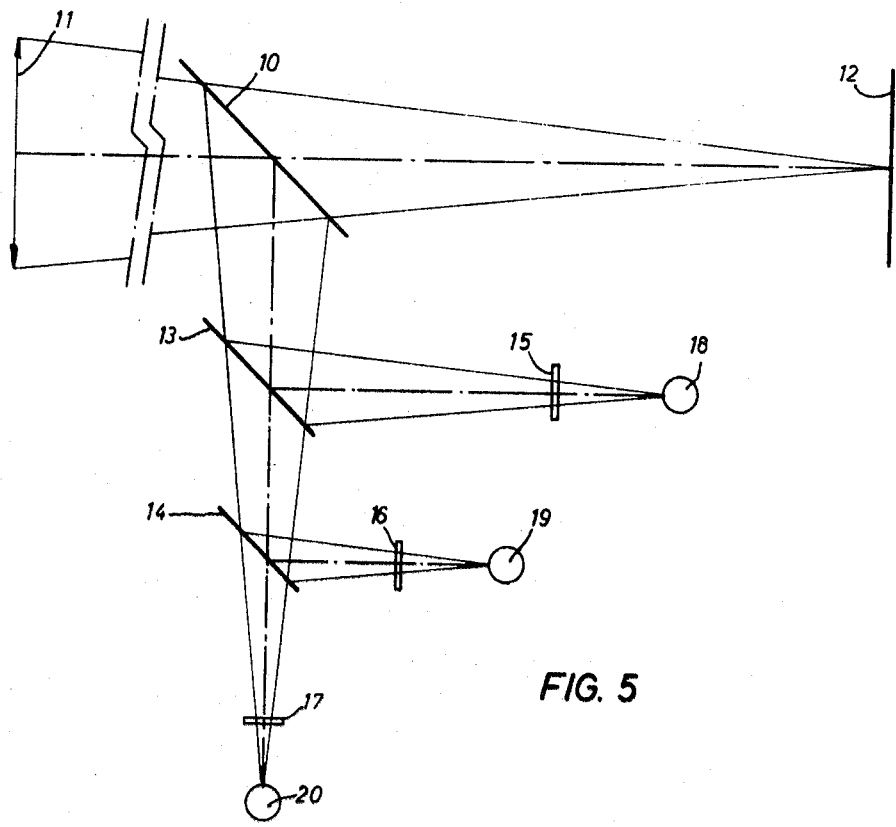
FIG. 5 shows diagrammatically the optical arrangement in a motion picture camera for measuring the luminance of the subject in three different regions.
Figure 6:
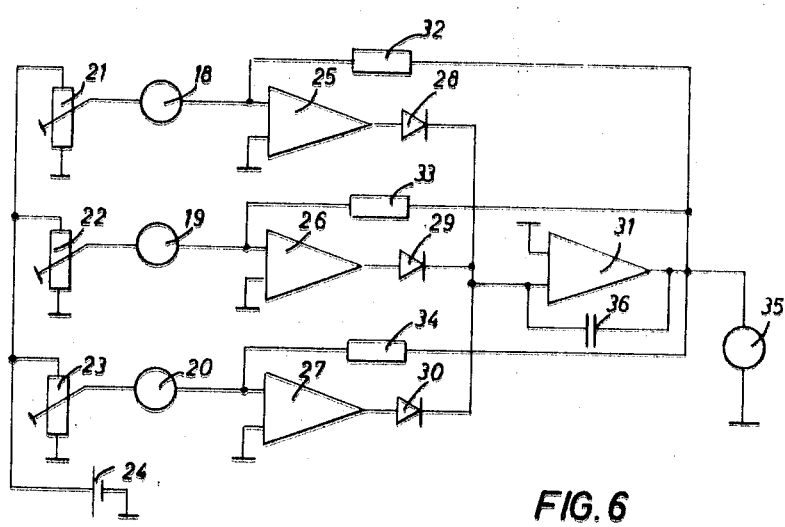
FIG. 6 is the electronic circuit for selecting the signal of greatest luminance.

A diagrammatic representation of an apparatus according to the present invention for measuring the luminances in the blue, the green and the red region, and for electronically determining the luminance of the region of greatest luminance, is shown in FIGS. 5 and 6.

In FIG. 5 a diagrammatic representation is given of the light paths in a conventional 16 mm motion picture camera wherein the shutter mechanism comprises a rotative mirror 10 which in the open position freely lets pass the image beam from the lens 11 to a colour film 12 and in the closed position, during which the film is transported over one frame, reflects the image beam onto an exposure-meter arrangement which, in the embodiment according to the present invention, comprises two beam splitters 13 and 14, filters 15, 16 and 17, cadmium sulfide cells 18, 19 and 20, and the electronic circuit which is shown in FIG. 6.

The spectral characteristics of the different optical elements are as follows :

$R_\lambda{}^{10}$ : spectral reflectance of the mirror 10

$R_\lambda{}^{13}$ : spectral reflectance of the beam splitter 13 which reflects the red region of the spectrum $T_\lambda{}^{13}$ : spectral transmission of the beam splitter 13 which transmits the green and blue regions $F_\lambda{}^{15}$ : spectral transmission of the filter 15

$R_\lambda{}^{14}$ : spectral reflectance of the beam splitter 14 which reflects the blue region of the spectram $T_\lambda{}^{14}$ : spectral transmission of the beam splitter 14 which transmits the green region $F_\lambda{}^{16}$ : spectral transmission of filter 16

$F_\lambda{}^{17}$ : spectral transmission of filter 17

$s_\lambda{}^{18}$ : spectral sensitivity of CdS cell 18

$s_\lambda{}^{19}$ : spectral sensitivity of CdS cell 19

$s_\lambda{}^{20}$ : spectral sensitivity of CdS cell 20

The transmission characteristics $F_\lambda{}^{15}$, $F_\lambda{}^{16}$, and $F_\lambda{}^{17}$ of filters 15, 16 and 17 are such that :

$$S_\lambda{}^r = R_\lambda{}^{10} \cdot R_\lambda{}^{13} \cdot F_\lambda{}^{15} \cdot S_\lambda{}^{18}$$

$$S_\lambda{}^{bl} = R_\lambda{}^{10} \cdot T_\lambda{}^{13} \cdot R_\lambda{}^{14} \cdot F_\lambda{}^{16} \cdot s_\lambda{}^{19}$$

$$S_\lambda{}^{gr} = R_\lambda{}^{10} \cdot T_\lambda{}^{13} \cdot T_\lambda{}^{14} \cdot F_\lambda{}^{17} \cdot s_\lambda{}^{20}$$

$S_\lambda$ being the spectral sensitivity of the colour film 12 in the three regions red, blue and green.

The electronic circuit for applying a voltage to the CdS cells and for comparing the currents flowing through them and selecting the current corresponding to the region of greatest luminance, is shown in FIG. 6.

The CdS cells 18, 19 and 20 are connected with one end to the sliders of three voltage dividing potentiometers 21, 22 and 23 which are connected to a source 24 of a constant D.C. voltage and with the other end to the input of the operational amplifiers 25, 26 and 27. The operational amplifiers are connected according to a non-inverting circuit, so that their output is in phase with the input. The output signals of the amplifiers are connecdted over diodes 28, 29 and 30 to the operational amplifier 31, connected as inverting amplifier. The amplifier circuit is fed back over resistors 32, 33 and 34. The output current of the circuit is measured by a galvanometer 35, the fluctuations of the pointer thereof being damped by a capacitor 36 which provides feedback over the amplifier 31.

In the operation of the apparatus, the CdS cell, say cell 18, which responds to the region of greatest luminance causes the greatest current to flow to the input of the amplifier, in the present case amplifier 25. The output voltage of the amplifier 25 is greater than that of the other two amplifiers so that only diode 28 is conductive. The signal is amplified in amplifier 31 and the output current thereof is indicated by the galvanometer 35.

The output signal causes a feedback current to flow through resistor 32 which is equal to the input current as determined by the cell 18, and the input voltage of amplifier 25 is zero. The same output signal causes feedback currents to flow through resistors 33 and 34 which are greater than the input currents from the cells 19 and 20, so that said amplifiers will be inversely driven and their output voltages will drive the anodes of the diodes 29 and 30 negatively in respect of the cathode potential. The fluctuations in the output current measured by the galvano-meter 35, and which are caused by the shutter which intermittently reflects the image beam to the exposure meter arrangement, and also by quick changes in the spectral composition and the brightness of the subject, are damped by the capacitor 36 which constitutes together with the amplifier 31 an integrator circuit with a time constant which is mainly determined by the mechanical characteristics of the galvanometer 35 or any other electromechanical device which indicates, or occasionally directly controls, the exposure adjustment of the recording apparatus as a function of the electric output of the exposure meter.

When during the recording, the spectral composition of the subject changes to such an extent that the maximum luminance occurs in another region of the spectrum, the corresponding cell becomes conductive and effects the selection of the corresponding channel in the circuit. In case two regions accidentally present the same luminance, the corresponding two diodes will conduct.

If for the mentioned four amplifiers use is made of integrated amplifier units, the complete electronic circuit as described may have a total volume smaller than, say 3 ccs.

The power pack for the apparatus may comprise a miniature battery 24 with constant discharge voltage characteristics such as the mercury batteries used in conventional exposure meters, and separate batteries or an accumulator for providing the power supply for the operational amplifiers. The supply for said amplifiers may also be derived over a voltage-stabilizing circuit from the battery driving the motor in the case of an electrically driven portable motion picture camera.

The beam splitters shown are dicroic mirrors which reflect one part of the spectrum and transmit another part. The mentioned optical arrangement for separating different regions of the spectrum may also be replaced, in case the exposure meter is sufficiently sensitive, by a simpler system wherein the light beam, which is available for the measurement is directly projected on three photo-cells located side by side which are each provided with a filter which transmits only one third of the visible spectrum. In this way each photo-cell receives at its maximum only about a ninth part of the available light energy.

A more sensitive exposure meter may comprise photosensitive silicium diodes. Such diodes are photovoltaic, and thus the battery 24 may be omitted. Moreover, their response range extends over more than four decades so that a wide range of subject bright-nesses may be covered without the need for neutral density filters to be located before the photo-cells in the case of higher luminances.

The sensitivity adjustment of each channel of the exposure meter may also occur in another way than by the potentiometers 21, 22 and 23, as shown. It is possible to effect the sensivitiy control by means of adjustable feedback resistors, either or not together with the input potentiometers 21, 22 and 23.

The photo-cells may have identical characteristics, or they may be selected so that their spectral response corresponds more particularly with the region in which the luminance is to be measured.

In the embodiment described so far, the exposure was determined only by the subject's region of greatest luminance.

If, according to another aspect of the invention, the measuring value corresponding to the region of greatest luminance of the subject has to be more taken into account than the measuring values corresponding to the regions of smaller luminance, the electronic circuit as shown in FIG. 6 may comprise for instance three resistors of relatively high value by which the inputs of the three amplifiers 25, 26 and 27 are connected to each other. As a result thereof, the current which determines the measurement will be smaller than the actual current which represents the region of greatest luminance.

Finally, it is possible to effect the measurement of the luminances in the three regions successively, rather than simultaneously as described so far. In that case, memory devices, e.g., capacitors, must be provided wherein the electric values which represent the different luminances are stored until the three regions have been measured, so that thereafter a comparison between them can be made and the electric value, corresponding to the region of greatest luminance, can be selected to be transmitted to means which is responsive thereto. As mentioned already hereinbefore said means may be a galvanometer, or it may be any other electromechanical device which indicates, or occasionally directly controls, the exposure of the recording material.

We claim:

1. Method of photographically recording a multicolored subject on a recording material which is spectrally sensitive to at least two different regions of the visible light spectrum corresponding to at least two colors of said subject, which method comprises the steps of:
   a. separately measuring the luminance of the colored subject in said at least two different spectral regions wherein the recording material is sensitive,
   b. exposing said at least two different spectrally sensitive regions of the recording material to a single radiation image transmitted by said color subject in said at least two different spectral regions, the extent of said exposure being adjusted substantially in accordance with said measured luminance of the subject in the region of the greatest luminance of said measured luminances, and
   c. developing the thus exposed recording material to produce the photographic recording of said subject.

2. Method according to claim 1, wherein the luminance of the subject is measured in the blue, the green and the red region of the spectrum.

3. Method according to claim 2, wherein the different luminances are measured simultaneously.

4. Method according to claim 1 including the steps of separately filtering the light reflected from said subject to transmit light in each of the blue, green and red spectral regions, measuring the luminance of the light transmitted after such filtering in each of said regions, multiplying each such measured luminance by a factor equal to the ratio of the luminance of light reflected without filtration from an average grey subject to the luminance of the light from such average grey subject when correspondingly filtered, and adjusting the exposure of said material to said subject substantially in accordance with the largest of the thus multiplied luminance values. which is carried out in the method of the present invention is a reflected-light measurement. This notion should be broadly interpreted and includes the measurement of the light which is reflected by an opaque subject, as well as of the light which is transmitted by a transparent original, e.g., a colour-slide. This is distinct from the measurement of light which is falling on the subject, and which is known as incident-light measurement.

An improved device for determining the exposure of a recording material which has to be exposed to a colour subject and which is spectrally sensitive in different regions of the visible spectrum may comprise at least two photo-electric cell means each of which is responsive to one of said different sensitivity regions of the recording material and produces an electric signal which is a measure of the luminance of the subject in said specific region.

An exposure-meter according to the present invention may comprise :

a. means for splitting a beam of incident light in the blue, the green and the red spectral region of the visible spectrum, b. three photoelectric cell means each of which receives light in one of said specific regions, c. three amplifiers for amplifying the electric signals produced by the said photoelectric cell means, and d. means for comparing the output signals of the amplifiers with each other and for selecting the signal which corresponds to the region in which the luminance is the greatest. The described arrangement, although appearing relatively complicated, may operate very reliable and may have very small dimensions, if use is made for the electronic part, of micro-electric elements such as integrated circuits.

The photo-electric cell means may be of the photovoltaic type, e.g., a selenium cell or a silicium diode, of the photo-resistive type, e.g. a cadmium-sulfide light-depending resistor, they may comprise a phototransistor, a photomultiplier tube, etc.

The exposure-meter may be an independent unit designed for operation with one hand, or it may be incorporated in the recording apparatus and the control of the exposure settings of such apparatus may occur automatically or through the intervention of the operator.

The measurement by an inbuilt exposure-meter may occur through the lens of the recording apparatus or it may occur in the vicinity of the lens.

The acceptance angle of the exposure-meter may be smaller than the taking angle of the recording apparatus and may even have a small value such as encountered in spotphotometers.

The term "recording material" as used in the present specification, includes any material or system which is spectrally sensitive in at least two different regions of the visible spectrum, and wherein the colour subject is reproduced in the form of a negative or a positive image, or in the form of an electrical charge pattern. The mentioned recording material may be light-sensitive black-and-white or colour photographic film used in still picture photography, motion picture photography, telefilm recording, in a photographic copying or printing apparatus, etc., but it may also be the screen or screens of an image-recording tube or -system.

The regions of the visible spectrum wherein the recording material is spectrally sensitive depend on the particular type of recording material. Thus, in the case of a conventional negative or reversal type of colour film, these regions are the blue, the green and the red part of the visible spectrum. In the case of a black and white film the regions are the blue and the green regions, for an orthochromatic, and the blue, the green and the red regions for a panchromatic film.

It should be understood that the spectral sensitivity of the recording material may extend in a range or ranges outside the visible spectrum, and thus recording materials having a sensitivity which extends up into the UV or the IR region also lend themselves to an improved exposure according to the method of the invention.

The invention is described hereinafter with reference to the accompanying drawings wherein :

FIG. 1 shows the spectral sensitization of a colour film.

FIG. 2 is the spectral response of an exposure-meter.

FIG. 3 is a diagram, wherein the reflectance of an average grey and a red subject are plotted.

FIG. 4 is a diagram wherein the spectral skin reflectance is plotted.

FIG. 5 shows diagrammatically the optical arrangement in a motion picutre camera for measuring the luminance of the subject in three different regions.

FIG. 6 is the electronic circuit for selecting the signal of greatest luminance.

In FIG. 1 the spectral sensitivity curves of a common photographic colour reversal material are shown, which have been determined by means of a common spectrosensitometer using an incandescent tungsten filament operating at a temperature of 3,200°K. The curves are plotted as effective response to the lamp. The parameter λ of the graph represents the wavelength in nm, whereas E is the energy distribution of the light source of 3,200°K and S is the sensitivity of the material as a function of the wavelength.

In FIG. 2 the spectral response of the exposure-meter which is used in the present expample, is shown. The curve generally corresponds to the spectral sensitivity of the eye and is also plotted as effective response to a lamp operating at 3,200°K, $s_\lambda$ being the sensitivity of the meter as a function of the wavelength, and $E_\lambda$ being again the energy distribution of a light source of 3,200°K. The exposure-meter is calibrated according to the speed of the colour material to indicate the exact exposure, i.e., exposure time and diaphragm opening. If an average grey scene is recorded, see the line drawn in full in the diagram of FIG. 3, the exposure-meter will give the following indication $E_e$ of the integrated effective light quantum reaching the photo-sensitive cell of the meter.

$$E_e = \int_\lambda E_\lambda \cdot R_\lambda \cdot s_\lambda \cdot d\lambda$$

wherein :

E = spectral energy distribution of the light source
R = spectral reflectance of the scene
$s_\lambda$ = spectral response of the exposure-meter.

With an average grey scene is intended in the present description a scene by which the overall luminance of the light, which is reflected or transmitted by the scene, is weakened with the exclusion however of alterations in chromacity, i.e., in hue and saturation of said light.

If a red scene is recorded with a spectral reflectance which is equal to that of the grey scene in the red region, see the curve in broken lines in FIG. 3, the exposure-meter will indicate a much smaller light energy, because less light is received on the photo-sensitive cell thereof.

As a consequence of the reduced reading of the exposure-meter the exposure of the photographic material will be increased so that over-exposure will result, and the red colour rendering will appear de desaturated. The same reasoning applies to the rendering of blue and magenta scenes.

The over-exposure will be less for green, yellow, and cyan scenes, because the exposure-meter is substantially green sensitive and thereby is less responsive to the absence of red and/or blue from the measured spectrum.

Hereinafter a numberical example is given for the recording of a grey and a red subject with a reflectance as already described, and of the skin tone, the spectral reflectance of which is shown in FIG. 4.

In the table the light energy values $$E_e = \int_\lambda E_\lambda \cdot s_\lambda \cdot R_\lambda \cdot d\lambda$$

which the photographic material which has a spectral sensitivity as shown in FIG. 1, and the cell of a conventional exposure-meter which has a spectral sensitivity as shown in FIG. 2, effectively responds. The actually measured light values of each column have been multiplied by a factor to obtain equal values for the first row, representing the energy quanta produced by reflection from a grey subject.

Table : Effective light values $$E_e = \int_\lambda E_\lambda \cdot s_\lambda \cdot R_\lambda \cdot d\lambda$$

Photographic material

| Subject | blue sens. layer | green sens. layer | red sens. layer | Exposure meter |
|---|---|---|---|---|
| grey | 1357 | 1357 | 1357 | 1357 |
| red | 160 | 160 | 1254 | 375 |
| skin | 380 | 519 | 938 | 599 |

From the Table it appears that the exposure-meter indicates for the red subject a luminance value which is 3.33 times smaller, and for the skin tone a value which is 1.56 times smaller than the actual luminance thereof as "seen" by the photographic material.

When the recording apparatus, e.g., the motion picture camera or the still picture camera, is adjusted according to the reading of the exposure-meter, the red subject will be over-exposed by a factor 0.52 logIt and the skin tones will be over-exposed by a factor 0.20 logIt.

When the spectral sensitivity of the exposure meter is higher in the red or in the blue than in the other regions, the anomalous readings of the meter will occur in other regions.

If the spectral sensitivity of the exposure-meter is uniform throughout the visible range of the spectrum, the anomalous behaviour as described still occurs.

If a black and white photographic light-sensitive material which is sensitive in the blue, the green and the red region were exposed to the scenes described hereinbefore, instead of the colour reversal material, over-exposure would occur as well for subjects deviating from the average grey.

The metnioned errors in the determination of the exposure are reduced to a great extent if the luminance of the subject is determined sequarately in the blue, the green and the red region, and if the reading of the exposure-meter corresponding to the region of greatest luminance of the subject is taken more into account than the readings corresponding to the other regions or, more particularly, if only the reading of the exposure-meter corresponding to the region of greatest luminance is taken as relevant to the exposure of the recording material.

This becomes clear when the values of the fourth and the fifth column of the table are compared with each other. The reading of the exposure-meter which is correct indeed for the average grey subject is much too low for the red subject, and too low also for the skin tone.

The selection of the spectral sensitivity regions of the cells or the cell of the exposure-meter used in the luminance measurements is determined essentially by the spectral sensitivities of the recroding material.

Theoretically, the spectral sensitivities of recording material and exposure-meter should coincide, including the additional absorptions caused by the lenses, covering glasses, neutral density filters, colour temperature conversion filters, etc. The great variety of known recording materials exclude such theoretical approach, but it is possible to make the spectral response of an exposure-meter correspond with the average sensitivity of a large number of commonly used recording materials, for each sensitivity region thereof, by an appropriate choice of the photo-responsive cells of the exposure-meter and/or the filters to be used therewith. When the spectral response to an exposure-meter has been determined as described, the sensitivity in each region is adjusted as follows. An average grey subject is illuminated by a light-source of the appropriate colour temperature, and the value of the luminance measured by the green sensitive cell is made to correspond with the reading on an conventional exposure-meter. This correspondence may occur by multiplication of the measured value by an appropriate factor, or by adjusting the sensitivity control of the exposure-meter.

Next, the values of the luminances measured by the blue and the red sensitive cells are multiplied by a factor to correspond with the value as measured by the green sensitive cell, or the sensitivity controls of the blue and red cells are set to obtain equal readings.

As a further requirement for the three cells is to be mentioned that (for optimum results) their responses as a function of the light intensity must be equal.

A diagrammatic representation of an apparatus according to the present invention for measuring the luminances in the blue, the green and the red region, and for electronically determining the luminance of the region of greatest luminance, is shown in FIGS. 5 and 6.

In FIG. 5 a diagrammatic representation is given of the light paths in a conventional 16 mm motion picture camera wherein the shutter mechanism comprises a rotative mirror 10 which in the open position freely lets pass the image beam from the lens 11 to a colour film 12 and in the closed position, during which the film is transported over one frame, reflects the image beam onto an exposure-meter arrangement which, in the embodiment according to the present invention, comprises two beam splitters 13 and 14, filters 15, 16 and 17, cadmium sulfide cells 18, 19 and 20, and the electronic circuit which is shown in FIG. 6.

The spectral characteristics of the different optical elements are as follows :

$R_\lambda{}^{10}$ : spectral reflectance of the mirror 10

$R_\lambda{}^{13}$ : spectral reflectance of the beam splitter 13 which reflects the red region of the spectrum $T_\lambda{}^{13}$ : spectral transmission of the beam splitter 13 which transmits the green and blue regions $F_\lambda{}^{15}$ : spectral transmission of the filter 15

$R_\lambda{}^{14}$ : spectral reflectance of the beam splitter 14 which reflects the blue region of the spectrum $T_\lambda{}^{14}$ : spectral transmission of the beam splitter 14 which transmits the green region $F_\lambda{}^{16}$ : spectral transmission of filter 16

$F_\lambda{}^{17}$ : spectral transmission of filter 17

$s_\lambda{}^{18}$ : spectral sensitivity of CdS cell 19

$s_\lambda{}^{19}$ : spectral sensitivity of CdS cell 19

$s_\lambda{}^{20}$ : spectral sensitivity of CdS cell 20

The transmission characteristics $F_\lambda{}^{15}$, $F_\lambda{}^{16}$, and $F_\lambda{}^{17}$ of filters 15, 16 and 17 are such that :

$$S_\lambda{}^4 = R_\lambda{}^{10} \cdot R_\lambda{}^{13} \cdot F_\lambda{}^{15} \cdot s_\lambda{}^{18}$$

$$S_\lambda{}^{bl} = R_\lambda{}^{10} \cdot T_\lambda{}^{13} \cdot R_\lambda{}^{14} \cdot F_\lambda{}^{16} \cdot s_\lambda{}^{19}$$

$$S_\lambda{}^{gr} = R_\lambda{}^{10} \cdot T_\lambda{}^{13} \cdot T_\lambda{}^{14} \cdot F_\lambda{}^{17} \cdot s_\lambda{}^{20}$$

$S_\lambda$ being the spectral sensitivity of the colour film 12 in the three regions red, blue and green.

The electronic circuit for applying a voltage to the CdS cells and for comparing the currents flowing through them and selecting the current corresponding to the region of greatest luminance, is shown in FIG. 6.

The CdS cells 18, 19 and 20 are connected with one end to the sliders of three voltage dividing potentiometers 21, 22 and 23 which are connected to a source 24 of a constant D.C. voltage and with the other end to the input of the operational apmplifiers 25, 26 and 27. The operational amplifiers are connected according to a non-inverting circuit, so that their output is in phase with the input. The output signals of the amplifiers are connecdted over diodes 28, 29 and 30 to the operational amplifier 31, connected as inverting amplifier. The amplifier circuit is fed back over resistors 32, 33 and 34. The output current of the circuit is measured by a galvanometer 35, the fluctuations of the pointer thereof being damped by a capacitor 36 which provides feedback over the amplifier 31.

In the operation of the apparatus, the CdS cell, say cell 18, which responds to the region of greatest luminance causes the greatest current to flow to the input of the amplifier, in the present case amplifier 25. The output voltage of the amplifier 25 is greater than that of the other two amplifiers so that only diode 28 is conductive. The signal is amplified in amplifier 31 and the output current thereof is indicated by the galvanometer 35.

The output signal causes a feedback current to flow through resistor 32 which is equal to the input current as determined by the cell 18, and the input voltage of amplifier 25 is zero. The same output signal causes feedback currents to flow through resistors 33 and 34 which are greater than the input currents from the cells 19 and 20, so that said amplifiers will be inversely driven and their output voltages will drive the anodes of the diodes 29 and 30 negatively in respect of the cathode potential. The fluctuations in the output current measured by the galvano-meter 35, and which are caused by the shutter which intermittently reflects the image beam to the exposure meter arrangement, and also by quick changes in the spectral composition and the brightness of the subject, are damped by the capacitor 36 which constitutes together with the amplifier 31 an integrator circuit with a time constant which is mainly determined by the mechanical characteristics of the galvanometer 35 or any other electromechanical device which indicates, or occasionally directly controls, the exposure adjustment of the recording apparatus as a function of the electric output of the exposure meter.

When during the recording, the spectral composition of the subject changes to such an extent that the maximum luminance occurs in another region of the spectrum, the corresponding cell becomes conductive and effects the selection of the corresponding channel in the circuit. In case two regions accidentally present the same luminance, the corresponding two diodes will conduct.

If for the mentioned four amplifiers use is made of integrated amplifier units, the complete electronic circuit as described may have a total volume smaller than, say 3 ccs.

The power pack for the apparatus may comprise a miniature battery 24 with constant discharge voltage characteristics such as the mercury batteries used in conventional exposure meters, and separate batteries or an accumulator for providing the power supply for the operational amplifiers. The supply for said amplifiers may also be derived over a voltage-stabilizing circuit from the battery driving the motor in the case of an electrically driven portable motion picutre camera.

The beam splitters shown are dicroic mirrors which reflect one part of the spectrum and transmit another part. The mentioned optical arrangement for separating different regions of the spectrum may also be replaced, in case the exposure meter is sufficiently sensitive, by a simpler system wherein the light beam, which is available for the measurement is directly projected on three photo-cells located side by side which are each provided with a filter which transmits only one third of the visible spectrum. In this way each photo-cell receives at its maximum only about a ninth part of the available light energy.

A more sensitive exposure meter may comprise photosenstive silicium diodes. Such diodes are photovoltaic, and thus the battery 24 may be omitted. Moreover, their response range extends over more than four decades so that a wide range of subject bright-necesses may be covered without the need for neutral density filters to be located before the photo-cells in the case of higher luminances.

The sensitivity adjustment of each channel of the exposure meter may also occur in another way than by the potentiometers 21, 22 and 23, as shown. It is possible to effect the sensitivity control by means of adjustable feedback resistors, either or not together with the input potentiometers 21, 22 and 23.

The photo-cells may have identical characteristics, or they may be selected so that their spectral response corresponds more particularly with the region in which the luminance is to be measured.

In the embodiment described so far, the exposure was determined only by the subject's region of greatest luminance.

If, according to another respect of the invention, the measuring value corresponding to the region of greatest luminance of the subject has to be more taken into account than the measuring values corresponding to the regions of smaller luminanace, the electronic circuit as shown in FIG. 6 may comprise for instance three resistors of relatively high value by which the inputs of the three amplifiers 25, 26 and 27 are connected to each other. As a result thereof, the current which determines the measurement will be smaller than the actual current which represents the region of greatest luminanace.

Finally, it is possible to effect the measurement of the luminanaces in the three regions successively, rather than simulatneoulsy as described so far. In that case, memory devices, e.g., capacitors, must be provided wherein the electric values which represent the different luminanaces are stored until the three regions have been measured, so that thereafter a comparision between them can be made and the electric value, corresponding to the region of greatest luminance, can be selected to be transmitted to means which is responsive thereto. As mentioned already hereinbefore said means may be a flavanometer, or it may be any other electromechanical device which indicates, or occasionally directly controls, the exposure of the recording material.

We claim:

1. Method of photographically recording a multicolored subject on a recording material which is spectrally sensitive to at least two different regions of the visible light spectrum corresponding to at least two colors of said subject, which method comprises the steps of:
   a. separately measuring the luminanace of the colored subject in said at least two different spectral regions wherein the recording material is sensitive,
   b. exposing said at least two different spectrally sensitive regions of the recording material to a single radiation image transmitted by said color subject in said at least two different spectral regions, the extent of said exposure being adjusted substantially in accordance with said measured luminance of the subject in the region of the greatest luminance of said measured luminances, and
   c. developing the thus exposed recording material to produce the photographic recording of said subject.

2. Method according to claim 1, wherein the luminance of the subject is measured in the blue, the green and the red region of the spectrum.

3. Method according to claim 2, wherein the different luminances are measured simultaneously.

4. Method according to claim 1 including the steps of separately filtering the light reflected from said subject to transmit light in each of the blue, green and red spectral regions, measuring the luminance of the light transmitted after such filtering in each of said regions, multiplying each such measured luminance by a factor equal to the ratio of the luminance of light reflected without filtration from an average grey subject to the luminance of the light from such average grey subject when correspondingly filtered, and adjusting the exposure of said material to said subject substantially in accordance with the largest of the thus multiplied luminance vlues.

* * * * *